United States Patent [19]

Albert

[11] Patent Number: 5,046,868
[45] Date of Patent: Sep. 10, 1991

[54] BEARING WIPER SEAL

[75] Inventor: Gregory P. Albert, Waverly, N.Y.

[73] Assignee: Ingersoll-Rand Company, Woodcliff Lake, N.J.

[21] Appl. No.: 512,563

[22] Filed: Apr. 23, 1990

Related U.S. Application Data

[63] Continuation of Ser. No. 266,657, Nov. 3, 1988, abandoned.

[51] Int. Cl.[5] .............................................. F16C 33/76
[52] U.S. Cl. ................................. 384/477; 277/81 R; 384/483
[58] Field of Search .............................. 384/481-488; 277/38, 39, 81 R, 95, 94, 36

[56] References Cited

U.S. PATENT DOCUMENTS

| | | | |
|---|---|---|---|
| 2,189,838 | 2/1940 | Shafer | 384/477 |
| 2,320,794 | 6/1943 | Pew | 277/95 |
| 3,572,858 | 3/1971 | Pompei | 384/477 |
| 4,541,741 | 9/1985 | Woodbridge et al. | 384/477 X |
| 4,545,692 | 10/1985 | Bras et al. | 384/477 |

*Primary Examiner*—Thomas R. Hannon
*Attorney, Agent, or Firm*—Robert F. Palermo; Arthur N. Trausch; Walter C. Vliet

[57] ABSTRACT

A sealing device for providing a seal between two relatively rotatable bearing components includes an annular ring having a radially inner and a radially outer flange. The flanges extend axially to define an annular channel. An annular wiper element is disposed in the channel so as to axially extend beyond the flanges. The annular ring is positioned axially adjacent to the rotational interface between the two bearing components so that the annular ring rotates with one bearing component and the wiper element is in surface contact with the other bearing component.

14 Claims, 1 Drawing Sheet

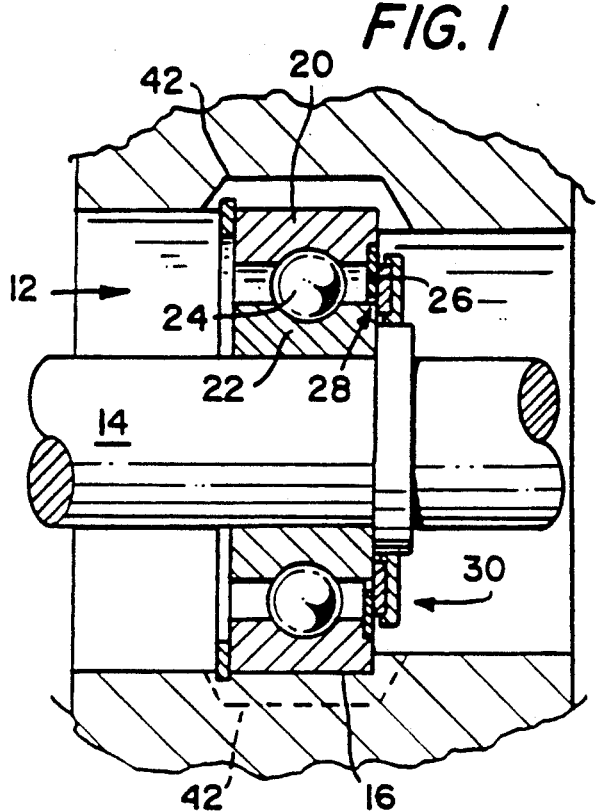
FIG. 1
FIG. 2
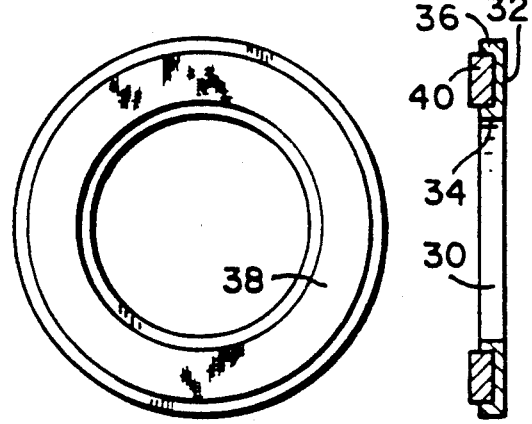
FIG. 3
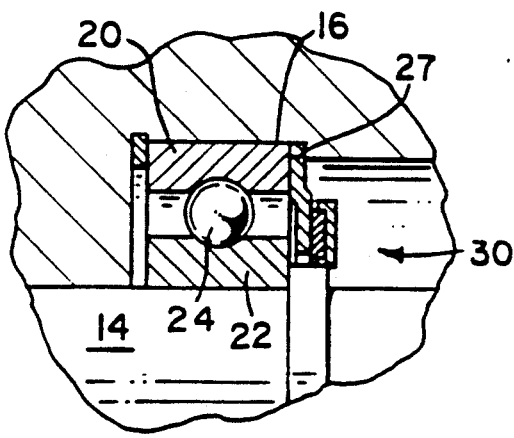
FIG. 4
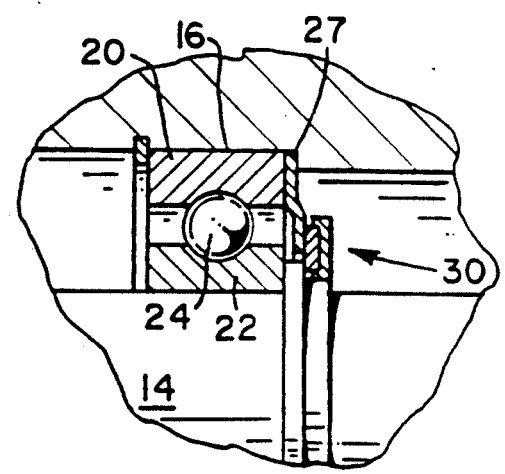
FIG. 5

BEARING WIPER SEAL

This application is a continuation of application Ser. No. 07/266,657, filed Nov. 3,1988 now abandoned.

FIELD OF THE INVENTION

This invention relates to a wiper seal for relatively rotating parts and more particularly to a bearing wiper seal for minimizing foreign particles in a bearing due to contaminated air flow.

BACKGROUND OF THE INVENTION

Machines which have high speed rotating parts supported by bearings, such as pneumatic tools, often use the exhaust motive fluid for cooling the bearings. Electric tools also generate an air flow to cool the bearings and other rotating parts. These air flows often contain particle contamination such as dirt or grit that may prematurely damage the bearings or rotating parts. In some machines, the bearings that support critical components are provided with complex and expensive sealing mechanisms to prevent particle contamination.

Common bearings used in dirty environments often have a shield between the outer race and the inner race. The shield is typically attached to the stationary race but there is still a clearance gap at the interface between the shield and the rotating race. For certain high speed pneumatic tools, such as grinders for example, dirty motive fluid exhaust can penetrate between the bearing shield and the rotating race. Other known seals typically have an elastomeric lip which rubs on the stationary race to prevent any particle contamination from entering the bearing chamber. However, these known seals generate friction and additional heat due to the rubbing contact. Also the known seals are expensive and not durable.

SUMMARY OF THE INVENTION

It is therefore a primary object of the present invention to provide an economical seal to increase the life of relatively rotating parts subject to contaminated air flow.

It is a further object of the present invention to provide a bearing wiper seal that can be durably used with common bearings.

Accordingly, a wiper seal provides a seal between two relatively rotatable parts such as bearing components. The seal housing includes an annular ring having a radially inner and a radially outer flange. Both flanges extend axially to define an annular channel. An annular wiper element is disposed in the channel so as to axially extend beyond the flanges The annular housing is positioned axially adjacent the interface between two relatively rotating components so that the annular housing and wiper rotates with one component and the wiper element is in light surface contact with the other component.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 1 is a cross sectional view of the preferred embodiment of the invention in use with, a radial bearing;

FIG. 2 is a plan view of the bearing wiper seal of the present invention;

FIG. 3 is a cross sectional view of FIG. 2;

FIGS. 4 and 5 are alternative embodiments.

DETAILED DESCRIPTION OF THE PREFERRED EMBODIMENT

The preferred embodiment of the present invention is illustrated by way of examples in FIGS. 1 through 3. Referring now to FIG. 1, the wiper seal is disclosed in a mechanism having a radial bearing 12 supporting a rotatable shaft 14 on a shoulder 16 of a machine housing for example. This invention can be used with other bearing configurations such as thrust bearings or with other relatively rotating parts. The scope of this invention should not be considered limited by the disclosed preferred embodiment In the preferred embodiment of FIG. 1, the outer race 20 of the bearing is supported by the machine housing and is stationary. The inner race 22 of the bearing rotatably supports and rotates with the shaft 14. Rolling elements 24 such as balls or rollers are positioned between the inner and outer race. A shield such as a ring 26 may be provided on one or both faces of the bearing between the outer and inner races. The shield element is typically press fit into a small notch in the stationary bearing race. For bearings not having a shield, a larger diameter ring member 27 may be press fit onto the shoulder portion 16 to shield the bearing opening (see FIGS. 4 and 5).

In the preferred embodiment shown in FIG. 1 the stationary outer race 20 and shield 26 forms a stationary assembly that has an interface 28 with the rotating inner race 22. Due to the pressure differential of the air flow, foreign particles on the upstream side of the bearing can penetrate the clearance gap between the shield and rotating race and damage the rolling elements.

As best seen in FIG. 1, an annular wiper seal 30 is provided axially adjacent the interface 28. The seal housing has a disc portion 32 and a radially inner flange 34 and a radially outer flange 36. The flanges extend axially to define an annular channel 38. An annular wiper element 40 in the shape of a ring is tightly fit in the channel. The wiper element 40 has a thickness so as to axially extend beyond the flanges even when compressed. This is best seen in FIG. 3.

The wiper seal 30 is positioned axially adjacent the interface between the two relatively rotating bearing components. The seal may be press fit on the shaft 14 so as to rotate with the shaft and inner race 22 as shown in the preferred embodiment. The seal 30 may also be affixed by other known methods. The seal could also be attached to other rotating parts adjacent the rotational interface in mechanisms having relatively rotating parts In the preferred embodiment the wiper seal 30 containing the wiper element 40 rotates with the rotating bearing component The wiper element 40 is in a light surface contact with the stationary shield and bearing race assembly. The outer flange 36 of the seal housing however is not in contact with the stationary shield. An appropriate axial clearance is provided between the rotating flange and the stationary shield. The wiper element 40 rotates with the rotating bearing race and bridges the gap at the interface 28 between the relatively rotating bearing components.

In operation, the wiper element 40 prevents foreign particles from entering the bearing chamber Some filtered air may leak through the gap 28. Any particle contaminants that come into contact with the wiper element are centrifugally flung radially outward and into alternative exhaust paths 42 in the mechanism housing around the bearing.

The preferred material for the wiper element 40 is a soft semi-permeable material such as S.A.E. No. F-50 quality white felt. Other natural or man-made fibrous material are also acceptable for use as the wiper element. Additionally, materials such as leather make a good wiper element. Felt, for example, has poor original shape retention and does not resiliently return to its full original shape. Thus when the seal 30 is installed, the felt is compressed and sets to a shape that has only light surface contact with the opposite bearing component Consequently, there is minimal axial load in the contact between the rotating wiping element and the non-rotating shield and bearing surface. The wiper element can absorb lubricant from the air flow. This further reduces any friction due to the light surface contact with the stationary components.

The light contact effectively excludes foreign particles from entering the bearing. Additionally, during startup and operation of pneumatic tools or electric tools, foreign particles are centrifuged away from the bearing by the rotating wiper element to prevent clogging. The wiper seal 30 also reduces the rate of air flow in and out of the bearing thereby helping to retain the lubricant within the bearing cavity.

One advantage of this invention is that it is simple and economical to manufacture, install and replace. When used with common bearings it substantially increases bearing life in dirty air environments. Consequently, the tool requires less frequent maintenance and repair. Additionally, the wiper seal helps keep the bearing grease clean and retains the grease inside of the bearing.

While the bearing wiper seal of the present invention has been disclosed in connection with a specific radial bearing embodiment, it should be appreciated that the wiper seal can be used with other bearings and with other relatively rotating parts. The present invention provides an economical and durable mechanism which can substantially increase the life of ordinary bearings in high speed rotational mechanisms that are subjected to dirty air. The seal operates under typical pneumatic pressures and generates little friction loading and therefore little heat since the wiper element is substantially in no load contact.

While the present invention has been disclosed in connection with a preferred embodiment, it should be understood that there may be other embodiments which fall within the scope and spirit of the invention as defined by the following claims.

I claim:

1. A bearing having rolling elements, inner and outer races, a shield, and a sealing device axially outward of said shield and said inner race, said sealing device comprising:
   an annular housing comprising a ring having a radially inner and a radially outer flange, both flanges extending axially from the ring to define an annular channel;
   an annular wiper element disposed in the channel so as to axially extend beyond both flanges; and
   means for positioning the sealing device axially adjacent an interface between the bearing inner race and shield so that said sealing device rotates with said inner race and said wiper element is in light surface contact with said bearing shield.

2. The sealing device of claim 1 wherein the wiper element comprises a compressible fibrous material having low resilience.

3. The sealing device of claim 1 wherein the wiper element is a felt ring.

4. The sealing device of claim 1 wherein the wiper element is a leather ring.

5. In combination with a bearing having rolling elements, a rotating race and a stationary shield fixed to a stationary race, a device for sealing a rotational interface between the rotating race and stationary bearing shield, comprising:
   an annular disc formed with inner and outer axially extending flanges which define an annular channel;
   an annular wiper element disposed in the channel so as to extend axially beyond both flanges; and
   means for positioning the sealing device co-axially with the bearing and axially adjacent the rotational interface so that the sealing device rotates with the rotating race and only the wiper element of said sealing device is in light axial surface contact with both the rotating race and the stationary bearing shield.

6. A device for sealing an axial gap between inner and outer relatively rotatable components of an anti-friction bearing, said sealing device being a separate entity and axially outward of said bearing, comprising:
   an annular channel shaped housing having a press fit on a shaft upon which is mounted said inner bearing component; and
   an annular wiper seal element disposed in said annular housing so that an axial face of said wiper projects axially beyond the channel sides of said housing to make light axial surface contact with both said inner and outer relatively rotatable bearing components.

7. The sealing device of claim 6 wherein the wiper element comprises a compressible fibrous material having low resilience.

8. The sealing device of claim 6 wherein the wiper element is a felt ring.

9. The sealing device of claim 6 wherein the wiper element is a leather ring.

10. A device for sealing an axial interface between a rotatable radially inner and a stationary radially outer component, said sealing device being a separate entity from both said components and axially outward of said interface, comprising:
    an annular housing having a channel shaped cross-section and having a press fit on a shaft which is rotatable relative to said radially outer component; and
    an annular wiper seal element disposed in said annular housing so that an axial face of said wiper projects axially beyond the axial sides of said channel shaped hosing to make light surface contact with said radially inner and radially outer component, said radially inner component being an annular projecting step on said rotatable shaft.

11. The sealing device of claim 10 wherein the wiper element comprises a compressible fibrous material having low resilience.

12. The sealing device of claim 10 wherein the wiper element is a felt ring.

13. The sealing device of claim 10 wherein the wiper element is a leather ring.

14. The sealing device of claim 10 wherein said radially outer component is a shield fixed to a stationary bearing outer race.

* * * * *